US011190616B2

(12) United States Patent
Salter et al.

(10) Patent No.: US 11,190,616 B2
(45) Date of Patent: Nov. 30, 2021

(54) DYNAMIC ENDPOINT COMMUNICATION CHANNELS

(71) Applicant: LIVEPERSON, INC., New York, NY (US)

(72) Inventors: Jeff Salter, Marietta, GA (US); Robert LoCascio, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 16/601,863

(22) Filed: Oct. 15, 2019

(65) Prior Publication Data

US 2020/0120185 A1 Apr. 16, 2020

Related U.S. Application Data

(60) Provisional application No. 62/745,552, filed on Oct. 15, 2018.

(51) Int. Cl.
*G06F 15/173* (2006.01)
*H04L 29/08* (2006.01)
*H04M 3/493* (2006.01)

(52) U.S. Cl.
CPC .......... *H04L 67/327* (2013.01); *H04L 67/141* (2013.01); *H04L 67/16* (2013.01); *H04M 3/4931* (2013.01); *H04M 3/4936* (2013.01)

(58) Field of Classification Search
CPC ..... H04L 67/327; H04L 67/141; H04L 67/16; H04M 3/4931
See application file for complete search history.

(56) References Cited

U.S. PATENT DOCUMENTS

| 7,536,437 B2 * | 5/2009 | Zmolek ................ H04W 4/029 709/206 |
| 9,990,591 B2 | 6/2018 | Gelfenbeyn et al. |
| 2002/0116492 A1 * | 8/2002 | Oldenborgh .......... G08G 1/161 709/224 |
| 2004/0117834 A1 * | 6/2004 | Karaoguz .......... H04N 7/17309 725/80 |
| 2004/0177165 A1 * | 9/2004 | Masputra .............. H04L 67/327 709/250 |

(Continued)

FOREIGN PATENT DOCUMENTS

| EP | 3 122 001 A1 | 1/2017 |
| WO | WO 2020/081494 A1 | 4/2020 |

OTHER PUBLICATIONS

International Search Report and Written Opinion for PCT Application No. PCT/US2019/056204 dated Jan. 3, 2020, 10 pages.

*Primary Examiner* — Razu A Miah
(74) *Attorney, Agent, or Firm* — Polsinelli LLP

(57) ABSTRACT

The present disclosure relates generally to systems, methods, and computer-readable storage media for providing a concierge service to handle a wide variety of topics and user intents via a common interface. The concierge service can be part of a connection management system that can dynamically manage and facilitate conversations between a user making a request or providing an instruction and one or more endpoints for the purposes of fulfilling the request or instruction. Such dynamic management may include transferring a communication session to a social network member endpoint based on an intent identified within natural language communications, tracking a dynamic sentiment score, and automatically switching the communication session to another endpoint based on a change in the dynamic sentiment score.

30 Claims, 15 Drawing Sheets

(56) References Cited

U.S. PATENT DOCUMENTS

| | | | |
|---|---|---|---|
| 2008/0102869 A1* | 5/2008 | Shaffer | H04L 65/4061 455/518 |
| 2008/0320133 A1* | 12/2008 | Le Merrer | H04L 67/104 709/224 |
| 2009/0063686 A1* | 3/2009 | Schmidt | H04L 67/16 709/227 |
| 2009/0150480 A1* | 6/2009 | Xia | H04L 65/602 709/203 |
| 2011/0225248 A1* | 9/2011 | Boyer | H04L 51/046 709/206 |
| 2013/0297689 A1* | 11/2013 | Bhat | H04L 51/32 709/204 |
| 2014/0136346 A1* | 5/2014 | Teso | G06Q 20/384 705/14.72 |
| 2014/0281029 A1* | 9/2014 | Danforth | H04L 45/74 709/243 |
| 2015/0095506 A1* | 4/2015 | Cao | H04L 45/42 709/228 |
| 2015/0263907 A1* | 9/2015 | Negishi | H04L 67/34 709/223 |
| 2015/0271271 A1* | 9/2015 | Bullotta | H04L 67/141 709/228 |
| 2016/0277536 A1* | 9/2016 | Barry | G06Q 10/0633 |
| 2017/0026318 A1* | 1/2017 | Daniel | H04L 51/046 |
| 2017/0208132 A1* | 7/2017 | Arnone | H04L 67/146 |
| 2017/0300831 A1* | 10/2017 | Gelfenbeyn | G10L 15/30 |
| 2017/0353533 A1* | 12/2017 | Thapar | H04L 67/10 |
| 2018/0084111 A1* | 3/2018 | Pirat | H04L 51/04 |
| 2018/0165554 A1* | 6/2018 | Zhang | G06K 9/6256 |
| 2018/0213046 A1* | 7/2018 | Cherdabayev | G06Q 50/01 |

* cited by examiner

DYNAMIC ENDPOINT COMMUNICATION CHANNELS

CROSS-REFERENCE TO RELATED APPLICATIONS

This application claims the benefit of U.S. Provisional Application No. 62/745,552, filed Oct. 15, 2018, which is hereby incorporated by reference in its entirety for all purposes.

FIELD

The present disclosure relates generally to communication processing using artificial-intelligence (AI). More specifically, techniques are provided to deploy an AI platform to select and manage endpoints in a communication channel, which enables customers to engage with endpoints best suited to answer natural language queries.

BRIEF DESCRIPTION OF THE DRAWINGS

The present disclosure is described in conjunction with the appended Figures.

Figure 1:
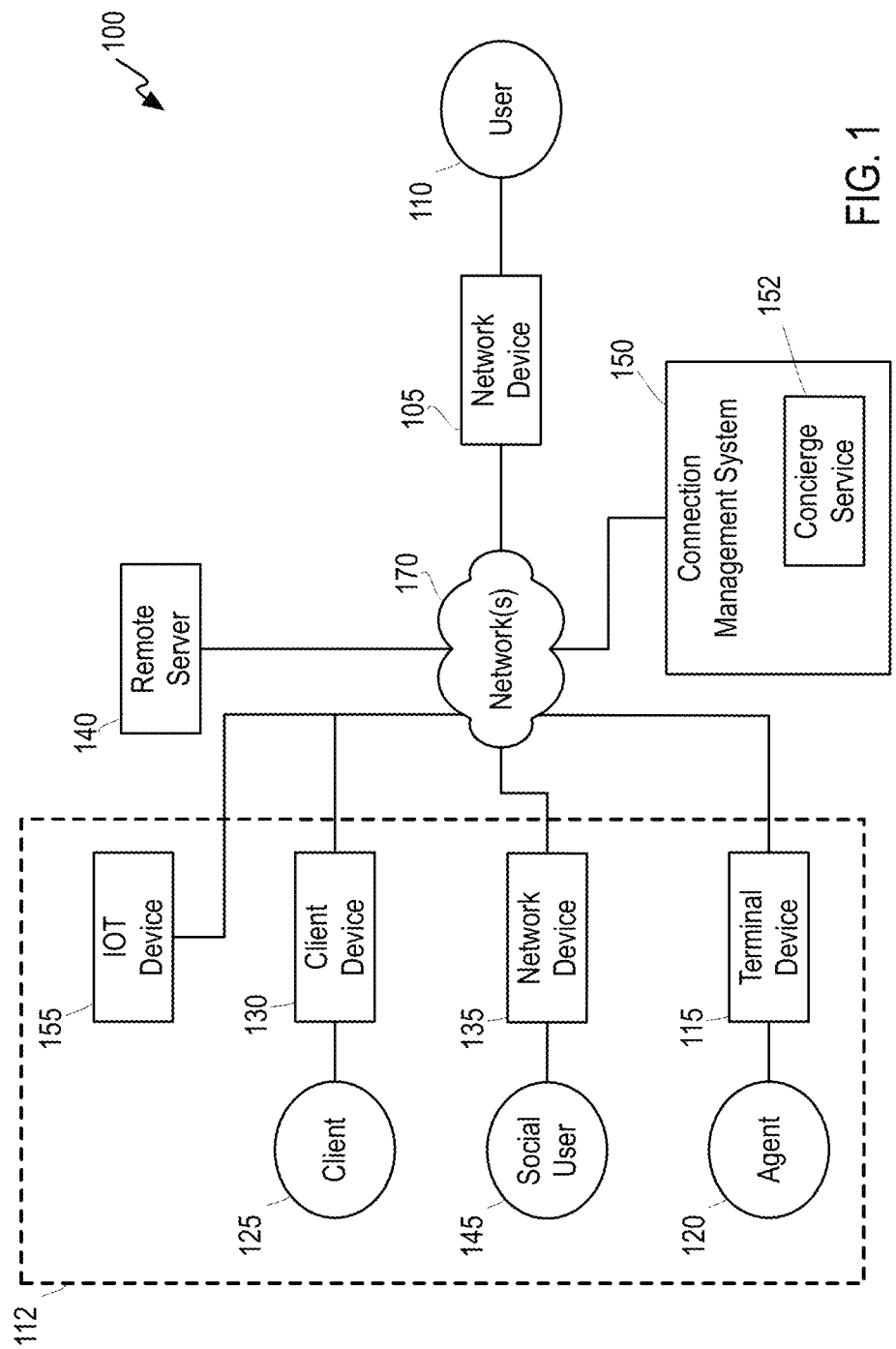
FIG. 1 shows an example embodiment of a network interaction system in accordance with some aspects of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

The present technology pertains to a concierge artificial intelligence service, for assisting users with tasks. The term "concierge" service is used to distinguish from prior art virtual assistants that can only perform a limited number of simple tasks, and that require a rigid protocol to communicate with. The concierge service described herein can receive a task by communications through any communication user interface on a network device, including, for example, a text message or other messaging application. The received communications can be received in natural language (i.e., that doesn't require conformance to a rigid protocol including wake words, key words, specific phrases, explicitly naming services, etc.).

The concierge service can determine an intent of the received natural language communication and determine an appropriate endpoint to help the user with the task, and can open a conversation between the network device and the appropriate endpoint. An endpoint can be a terminal device of an agent, a network device of a social network user, an application programming interface (API) of a service, or an Internet-of-things (IOT) device.

In some embodiments, the concierge service can be contacted by addressing the natural language communications to a public address, such as a phone number, IP address, or URL.

In some embodiments, the concierge service of the present technology can receive communications that originate from a text messaging application. Text messaging applications can be characterized by some undesirable qualities, e.g., you cannot add or remove addresses from a conversation; conversation threads are strictly linear and therefore multiple topic threads are difficult to differentiate; etc. The concierge service can overcome this quality by acting as a mediator between a user operating an associated network device and one or more endpoints that to be added to a conversation or removed. Additionally, when the concierge service detects an additional or new intent in the text message chain, the concierge service can delineate the conversations and present messages in a way that is clear to the user. Furthermore, when different endpoints are associated with different conversations, the concierge service of the present technology can route only messages intended for endpoints in the respective conversation to the intended endpoints.

The present technology addresses deficiencies in virtual assistant technology. Prior art virtual assistants often require a user that is requesting assistance with a task to conform to a rigid protocol to instruct the virtual assistant how to complete a task. For example, prior art virtual assistants either require a user to tell the virtual assistant what service can perform the task (e.g., "get me a ride home using Lyft"—the user is required to name the ride service "Lyft"), or require a user to tell the virtual assistant to perform a recognized task using a specific phrase (e.g., "can I have a 'news briefing?' The phrase 'news briefing' is a specific phrase linked to summaries from one or more configured news sources). Such a manner of interacting with virtual assistants limits the utility of a virtual assistant to only tasks to which the assistant and the user is trained. Current virtual assistants are impeded from learning new tasks organically from user requests, and instead the companies that provide the virtual assistants, and/or those that offer services through the virtual assistant must configure the virtual assistant.

The present technology can process requests given in natural language—that doesn't require conformance to rigid protocol. The present technology can perform natural language processing techniques to understand a user's intent, and can select an available endpoint that matches the appropriate intent. Accordingly, the present technology does not require the user to be trained to gain benefits from the concierge service.

Additionally, when the concierge service does not know of a service to handle the user's intent, the request can still be handled, whereas prior art virtual assistants fail when a specific service cannot be identified. Prior art virtual assistants are limited to a relatively small number of available tasks, and these tasks are of limited complexity. Prior art virtual assistants also don't link together multiple services based on a user's intent, without being rigidly preconfigured to do so.

The present technology also improves over prior art virtual assistants by being platform agnostic. This has important technological implications. For example, the present technology can service a greater number of users, and therefore its performance, powered by a machine-learned algorithm, is more robust and accurate since it is trained on a larger dataset.

The present technology has also been designed with several technological efficiencies. In one example, the present technology utilizes standard messaging applications to interface with a "concierge" artificial intelligence service. This provides the efficiencies in that no new software needs to be downloaded and executed on users' network devices, that the concierge artificial intelligence service is server-based, and therefore can be updated based on new machine learning more frequently than when portions of artificial intelligence trained by machine learning or installed on users' network devices.

The present technology also solves a particular problem prevalent on users' network devices. Modern network devices require many 'Apps', each for their specific purpose. This causes the negative result that users must remember what function each App performs, and in order to use they App they must hunt through sometimes hundreds of Apps to find the right one. The present technology overcomes these deficiencies by making use of user interfaces already available in other ubiquitous Apps (i.e., a text messaging application).

These and other advantages will be apparent to those of ordinary skill in the art from the description that follows.

FIG. 1 shows a block diagram of an embodiment of a network interaction system 100 which implements and supports certain embodiments and features described herein. Certain embodiments relate to establishing connections between a network device 105 (which can be operated by a user 110), and endpoints 112 such as: a terminal device 115 (which can be operated by an agent 120), a client device 130 (operated by a client 125), a network device 135 (which can be operated by a social user 145), and/or an Internet-of-Things (IOT) device 155.

In some embodiments, a user 110 can be an individual browsing a web site or accessing an online service provided by a remote server 140. In some embodiments, user 110 can be an individual looking to have a service performed on their behalf. Such a service can include having a question answered, operating another device (such as IOT device 155), getting help from an agent with a task or service, conducting a transaction, etc.

A client 125 can be an entity that provides, operates, or runs the web site or the online service, or individuals employed by or assigned by such an entity to perform the tasks available to a client 125 as described herein.

The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

A social user 145 can be an individual or a group that is part of the social network of user 110. A social user 145 can be a direct connection to user 110, or can be a connection one or more degrees removed from user 110. In some embodiments, social user 145 is registered with connection management system 150 by request of user 110 or social user 145. In some embodiments, social user 145 is registered with connection management system 150 after receiving permission to retrieve information pertaining to the social graph of user 110. Such retrieval should be performed according to the intent of user 110 and/or intent of social user 145 and in accordance with the policies of the social media network.

In some embodiments, a social user 145 can also be an agent 120. When a social user has a particular topic of expertise that is recorded by connection management system 150, the social user 145 can be considered an agent 120 for the designated topic, and be considered a social user 145 for other topics as described in greater detail herein.

While FIG. 1 shows only a single network device 105, terminal device 115, client device 130, network device 135, and IOT device 155, an interaction system 100 can include multiple or many (e.g., tens, hundreds or thousands) of each of one or more of these types of devices. Similarly, while FIG. 1 shows only a single user 110, agent 120, client 125, and social user 145, an interaction system 100 can include multiple or many of each of one or more of such entities. Thus, it may be necessary to determine which endpoint is to be selected to communicate with a given network device. Further complicating matters, a remote server 140 may also be configured to receive and respond to select communications with network device 105.

A connection management system 150 can facilitate strategic routing of communications. Connection management system 150 can provide a concierge service 152, for communicating with user 110 and endpoints 112. Concierge service 152 can be a conversational interface used to understand natural language communications, generate replies and questions in a conversation thread, and to inform connection management system 150 of characteristics of received natural language communications.

A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some embodiments, connection management system 150 routes the entire communication to another device. In some embodiments, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connections between network device 105 and one or more terminal devices 115. For example, upon receiving a communication from network device 105, connection management system 150 can estimate to which client (if any) the communication corresponds. Upon identifying a client, connection management system 150 can identify a terminal device 115 associated with the client for communication with network device 105. In some embodiments, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some embodiments, connection management system 150 can determine whether any connections are established between network device 105 and an endpoint 112 associated with the client (or remote server 140) and, if so, whether such channels are to be used to exchange a series of communications including the communication.

Upon selecting an endpoint 112 to communicate with network device 105, connection management system 150 can establish connections between the network device 105 and the endpoint 112. In some embodiments, connection management system 150 can transmit a message to the selected endpoint 112. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In some embodiments, communications between network device 105 and endpoint 112 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. As will be described further herein, such configurations can facilitate management of conversations between user 110 and one or more endpoints 112.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular product, connection management system 150 can automatically transmit an additional message to endpoint 112 containing additional information about the product (e.g., quantity of products in stock, links to support documents related to the product, or other information about the product or similar products).

In some embodiments, a designated endpoint 112 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some embodiments, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115, network device 135, IOT device 155, and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal, IOT and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
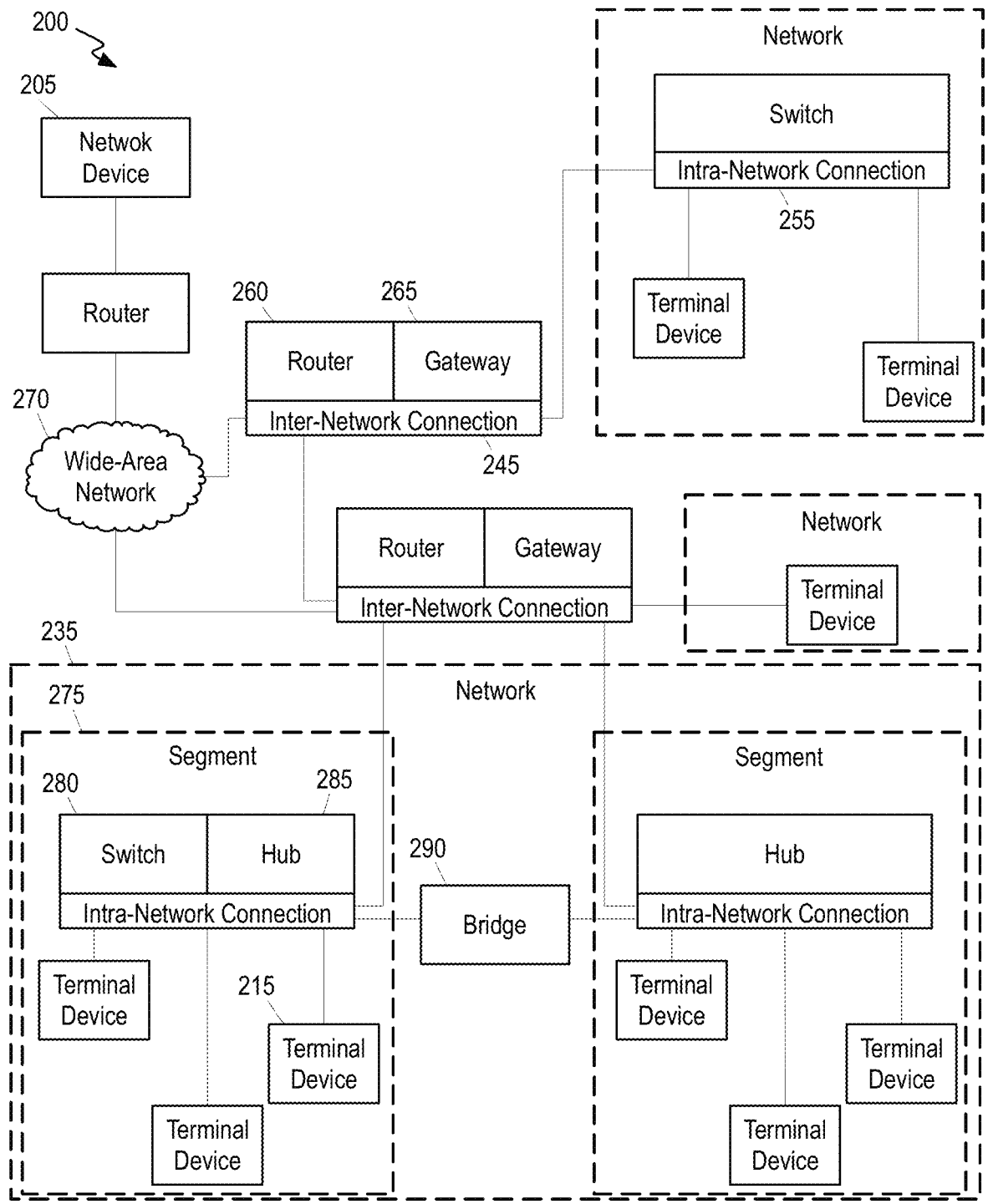
FIG. 2 shows an example embodiment of a network interaction system in accordance with some aspects of the present technology.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some embodiments, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some embodiments, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, In some embodiments, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
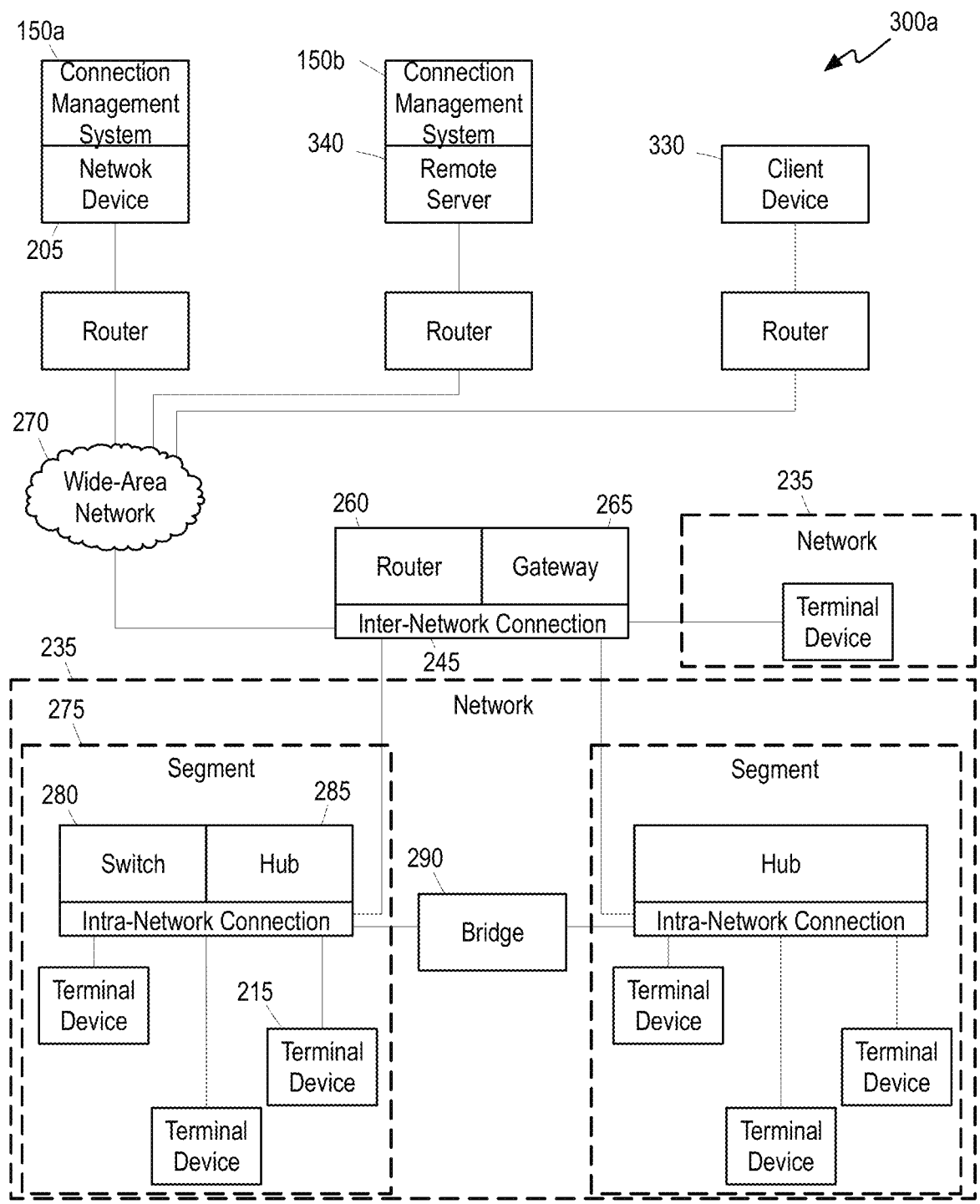
FIGS. 3A, 3B, and 3C show example embodiments of a network interaction system that includes a connection management system in accordance with some aspects of the present technology.
Figure 3B:
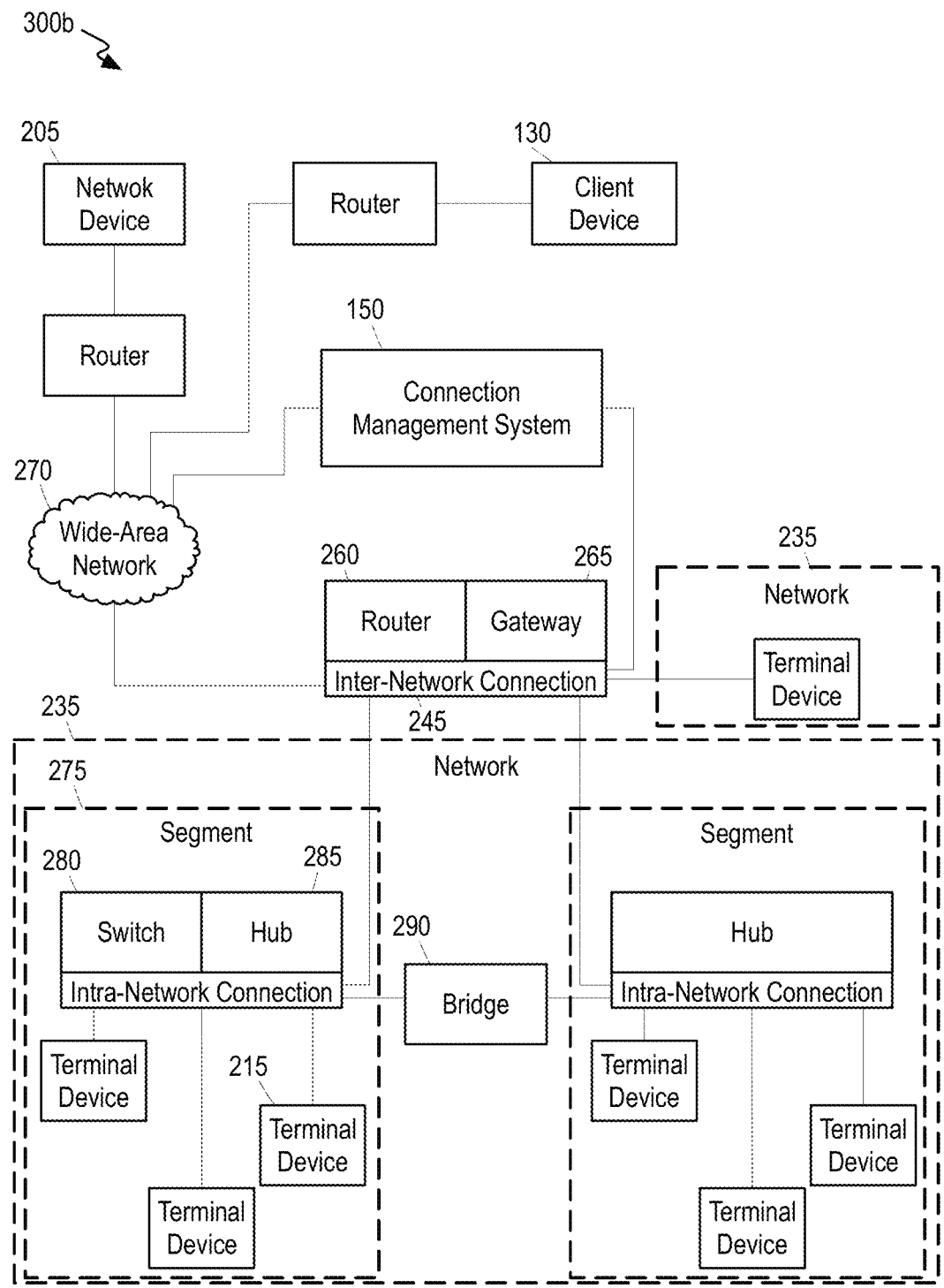
Figure 3C:
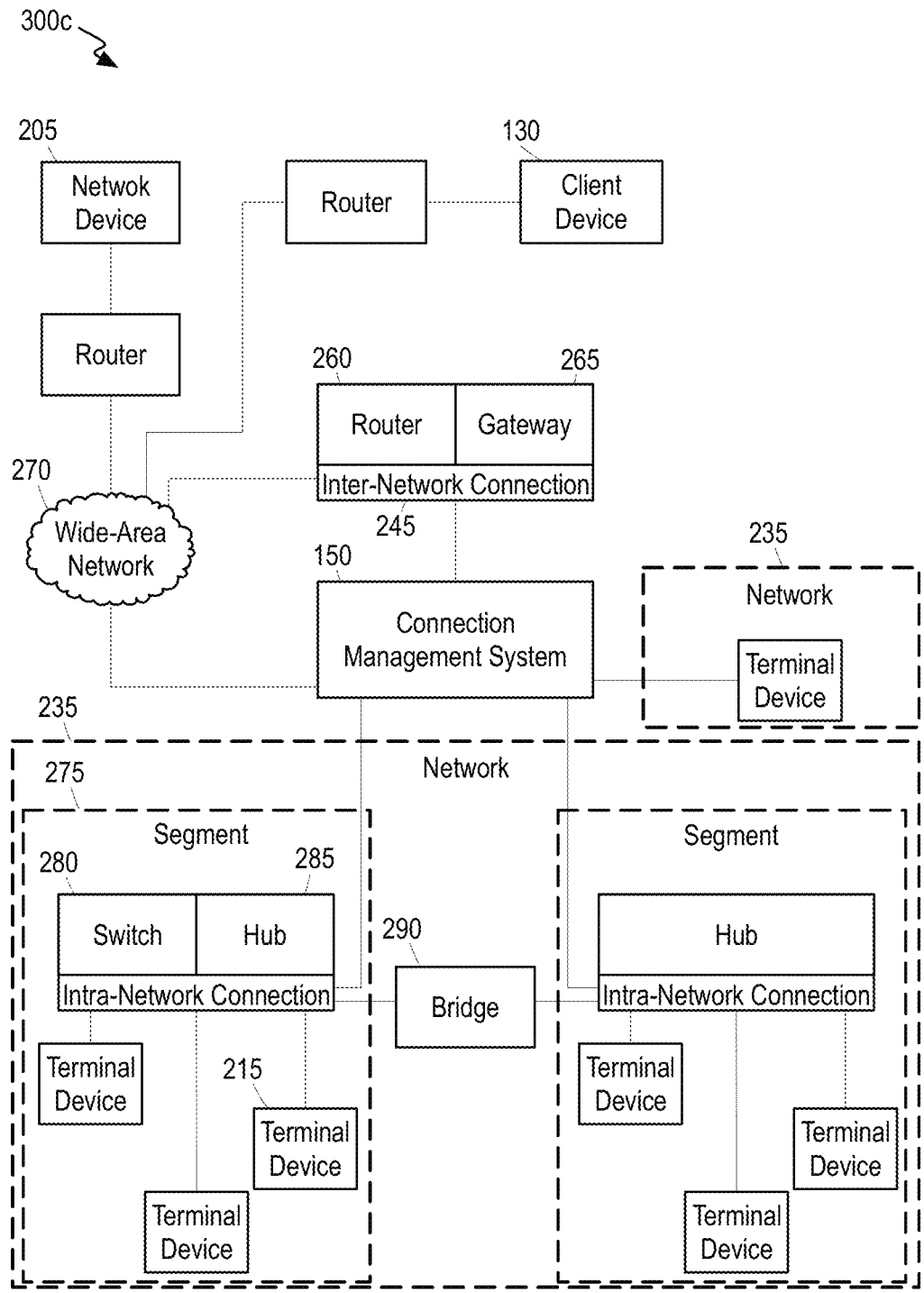

FIGS. 3A, 3B, 3C show block diagrams of other embodiments of a network interaction system 300a, 300b, 300c that includes a connection management system. Each of the depicted systems 300a, 300b, 300c show only two local-area networks 235 for simplicity, though it can be appreciated that embodiments can be extended to expand the number of local-area networks. Each of systems 300a, 300b, 300c include a connection management system 150, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

In FIG. 3A, connection management system 150 is associated with each of network device 205 and a remote server 340 (e.g., connection management system 150a is associated with network device 205 and connection management system 150b is associated with remote server 340). For example, connection management system 150a and/or connection management system 150b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 150b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 150b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 150 can be configured to serve as a relay and/or destination address. Thus, for example, a set of network devices 205 may transmit communications, each identifying connection management system 150 as a destination. Connection management system 150 can receive each communication and can concurrently monitor a set of terminal devices (e.g., so as to generate metrics for each terminal device). Based on the monitoring and a rule, connection management system 150 can identify a terminal device 215 to which it may relay each communication. Depending on the embodiment, terminal device communications may similarly be directed to a consistent destination (e.g., of connection management system 150) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 150 is directly connected to intra-network components (e.g., terminal devices, intra-network connections, or other).

It will be appreciated that many variations of FIGS. 3A-3C are contemplated. For example, connection management system 150 may be associated with a connection component (e.g., inter-network connection component 245 or intra-network connection component 255) such that an application corresponding to connection management system 150 (or part thereof) is installed on the component. The application may, for example, perform independently or by communicating with one or more similar or complementary applications (e.g., executing on one or more other components, network devices or remotes servers).

Figure 4:
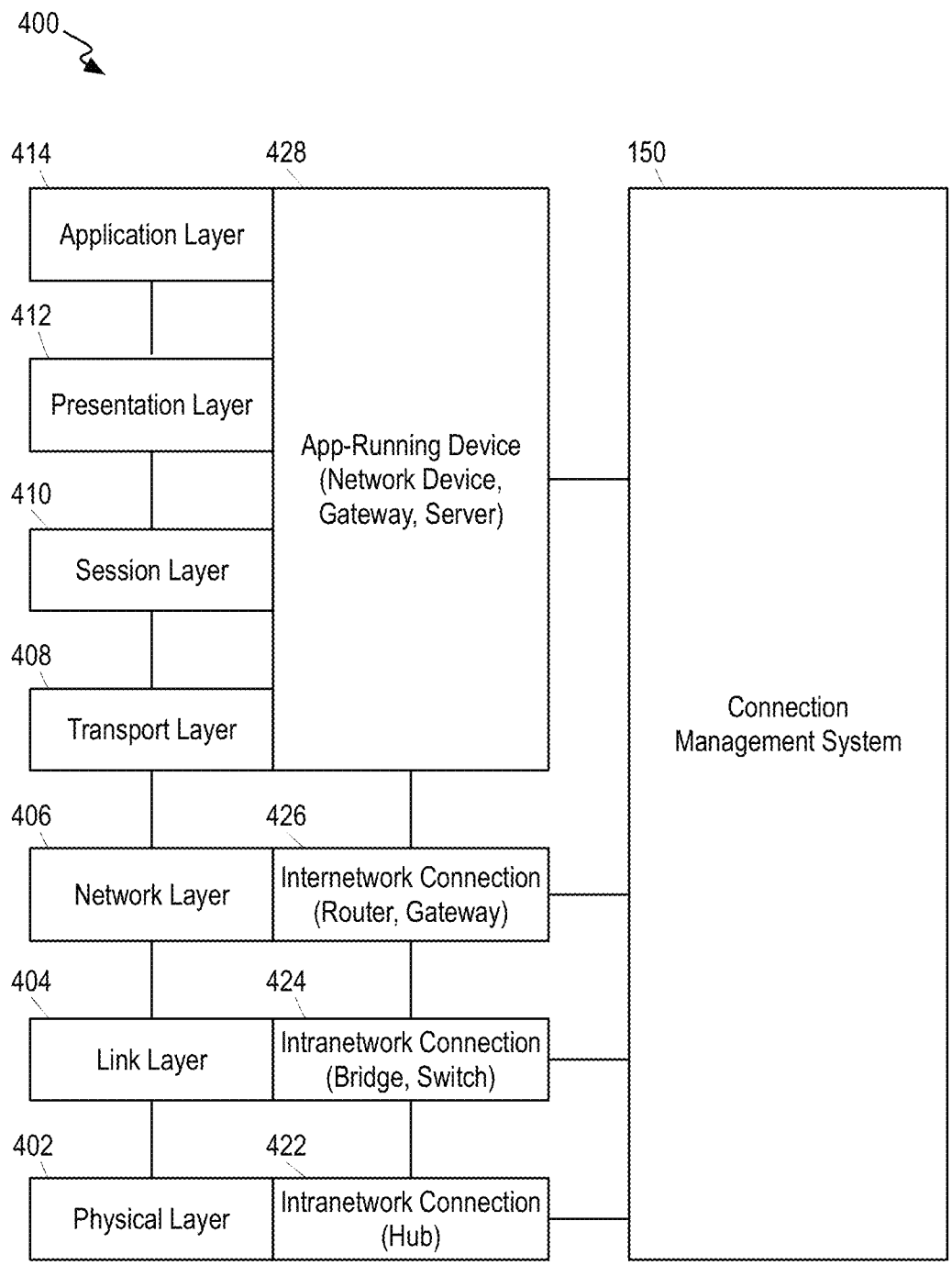
FIG. 4 shows a representation of a protocol-stack mapping of connection components' operation in accordance with some aspects of the present technology.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP).

Transport layer 408 can perform segmentation/desegmentation of data packets for transmission and can detect and account for transmission errors occurring in layers 402, 404, 406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402, 404, 406, 408, 410, 412, 414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406, 408, 410, 412, 414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 150 can interact with and/or operate on, in various embodiments, one, more, all or any of the various layers. For example, connection management system 150 can interact with a hub so as to dynamically adjust which terminal devices the hub communicates. As another example, connection management system 150 can communicate with a bridge, switch, router or gateway so as to influence which terminal device the component selects as a destination (e.g., MAC, logical or physical) address. By way of further examples, a connection management system 150 can monitor, control, or direct segmentation of data packets on transport layer 408, session duration on session layer 410, and/or encryption and/or compression on presentation layer 412. In some embodiments, connection management system 150 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 150 can influence communication routing and channel establishment (or maintenance or termination) via interaction with a variety of devices and/or via influencing operating at a variety of protocol-stack layers.

Figure 5:
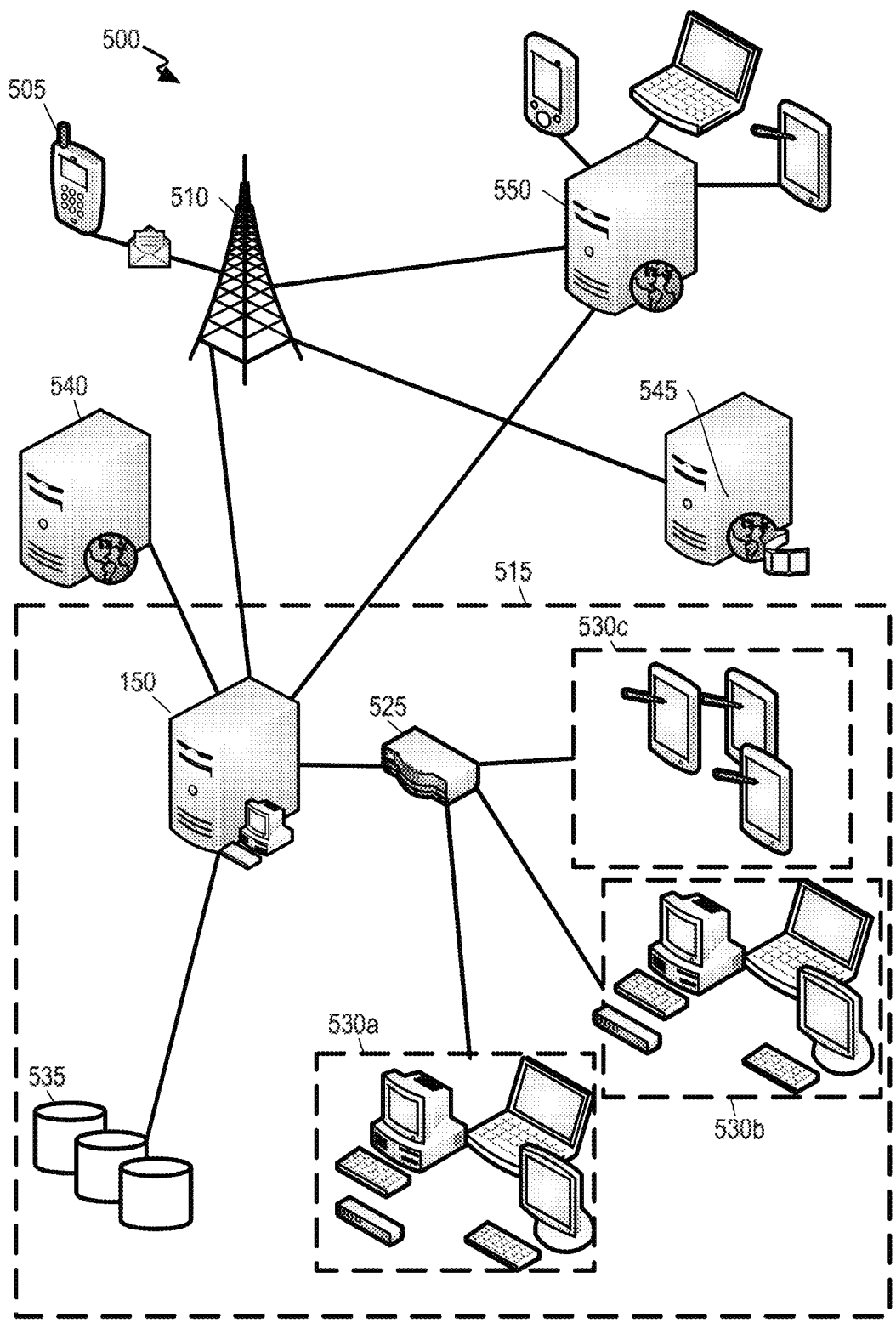
FIG. 5 represents a multi-device communication exchange system embodiment in accordance with some aspects of the present technology.

FIG. 5 represents a multi-device communication exchange system 500 according to an embodiment. System 500 includes a network device 505 configured to communicate with a variety of types of endpoints over a variety of types of communication channels.

In the depicted instance, network device 505 can transmit a communication over a cellular network (e.g., via a base station 510). The communication can be routed to an operative network 515. Operative network 515 can include a connection management system 150 that receives the communication and identifies which endpoint is to respond to the communication. Such determination can depend on identifying a client to which that communication pertains (e.g., based on a content analysis or user input indicative of the client) and determining one or more metrics for each of one or more endpoints associated with the client. For example, in FIG. 5, each cluster of endpoints 530a, 530b, -530c can correspond to a different client. The endpoints may be geographically co-located or disperse. The metrics may be determined based on stored or learned data and/or real-time monitoring (e.g., based on availability).

Connection management system 150 can communicate with various endpoints via one or more routers 525 or other inter-network or intra-network connection components. Connection management system 150 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 150 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some embodiments, communication with such a server provided an initial option to initiate a communication exchange with connection management system 150. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 150 may be able to estimate a general (or user-specific) intent towards a given topic or estimate a general behavior of a given user or class of users. Social networking server 550 can also maintain a social graphs for one or more users. A social graph can consist of first level connections (direct connections) of a social user, and additional levels of connections (indirect connections through the user's direct connections)—all of which can be potential social users 145 as described herein.

Figure 6:
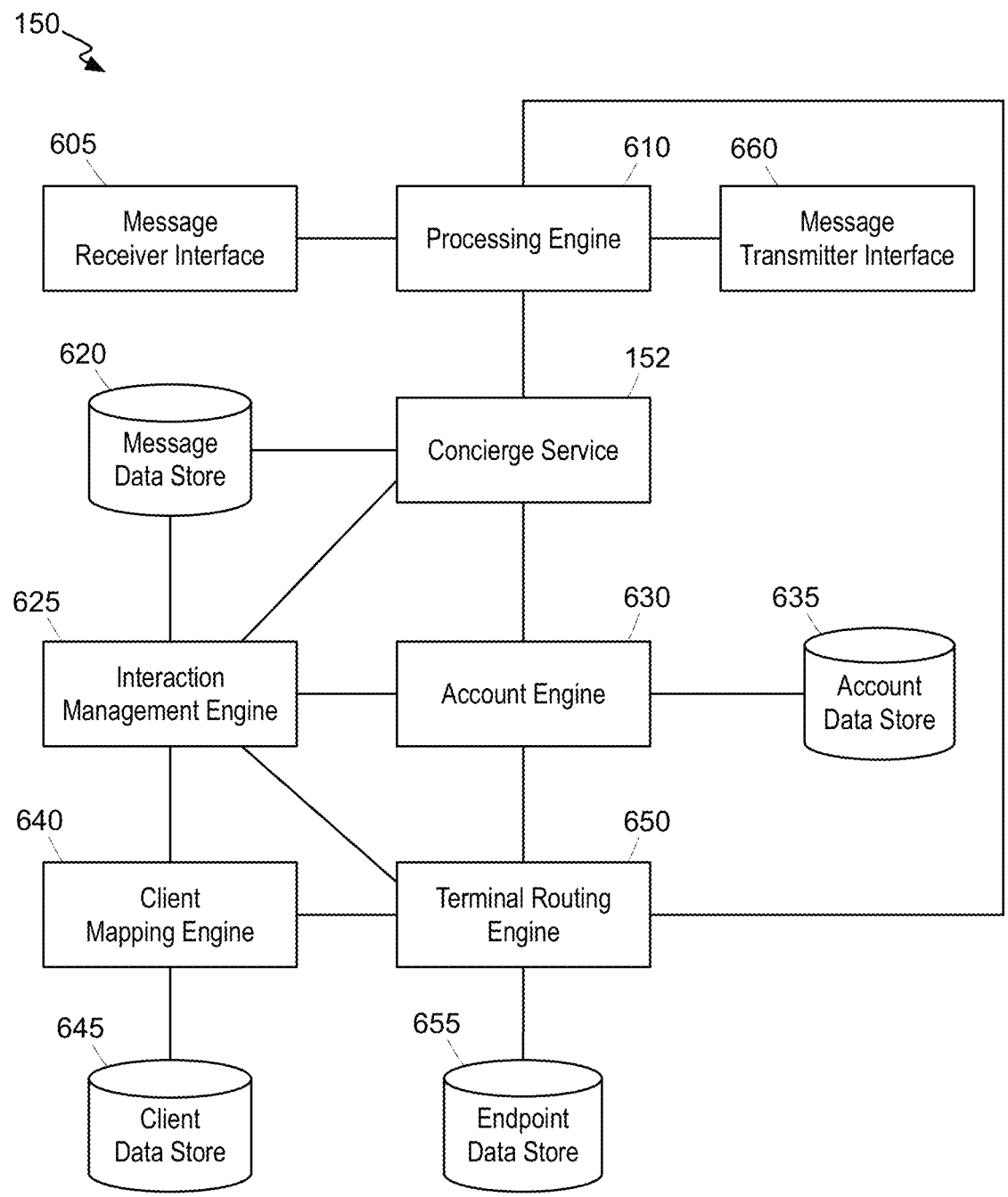
FIG. 6 shows an example embodiment of a connection management system in accordance with some aspects of the present technology.

FIG. 6 shows a block diagram of an embodiment of a connection management system 150. A message receiver interface 605 can receive a message. In some embodiments, the message can be received, for example, as part of a communication transmitted by a source device (e.g., housed separately from connection management system 150 or within a same housing), such as a network device or endpoint. In some embodiments, the communication can be part of a series of communications or a communicate exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at an user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client that can be sent to concierge service 152.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A concierge service 152 may assess the (e.g., extracted or received) message. The assessment can include identifying, for example, one or more intents for the message. Examples of intents can include (for example) topic, sentiment, complexity, and urgency A topic can include, but it not limited to, a subject, a product, a service, a technical issue, a use question, a complaint, a refund request or a purchase request, etc. A intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some embodiments, an intent can be clarified by engaging user 110 in a conversation that can include clarifying questions, or simply requesting additional information.

In some embodiments, concierge service 152 can utilize a conversational interface to understand the natural language communications, to recognize the intent of the communications, and to engage the user in a dialog. Conversational interfaces are a type of artificial intelligence, trained using machine learning or deep learning algorithms. In addition to interpreting language, conversational interfaces can also communicate back to users through questions and statements that make sense in the context of a dialog between the user and the conversational interface. Conversational interfaces are sometimes known as "bots" and "chat bots." One example of a conversational interface is known as Lex, by Amazon Web Services.

In some embodiments, concierge service 152 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Concierge service 152 can store a message, message metric and/or message statistic in a message data store 620. Each message can also be stored in association with other data (e.g., metadata), such as data identifying a corresponding source device, destination device, network device, endpoint, client, one or more categories, one or more stages and/or message-associated statistics). Various components of connection management system 150 can query message data store 620 to retrieve query-responsive messages, message metrics and/or message statistics.

An interaction management engine 625 can determine to which endpoint 112 a communication is to be routed and how the receiving and transmitting devices are to communicate. Each of these determinations can depend, for example, on whether a particular network device (or any network device associated with a particular user) has previously communicated with an endpoint in a set of endpoints 112 (e.g., any endpoint associated with connection management system 150 or any endpoint associated with one or more particular clients).

In some embodiments, when a network device (or other network device associated with a same user or account) has previously communicated with a given endpoint (e.g., about matters relating to a client), communication routing can be generally biased towards the same endpoint. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more endpoints 112); whether the endpoint is available; and/or a predicted response latency of the endpoint. Such factors may be considered absolutely or relative to similar metrics corresponding to other endpoints 112. A re-routing rule (e.g., a client-specific or general rule) can indicate how such factors are to be assessed and weighted to determine whether to forego agent consistency.

When a network device (or other network device associated with a same user or account) has not previously communicated with a given endpoint 112 (e.g., about matters relating to a client), an endpoint 112 selection can be performed based on factors such as, for example, an extent to which various agents' knowledge base corresponds to a communication topic, availability of various agents at a given time and/or over a channel type, types and/or capabilities of endpoints 112, a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A endpoint selection can then be made by comparing endpoints' 112 scores (e.g., to select a high or highest score).

With regard to determining how devices are to communicate, interaction management engine 625 can (for example) determine whether an endpoint 112 is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints 112. Appreciably, some communication types will result in real-time communication (e.g., where fast message response is expected), while others can result in asynchronous communication (e.g., where delays (e.g., of several minutes or hours) between messages are acceptable).

In some embodiments, the communication type can be a text messaging or chat application. These communication technologies provide the benefit that no new software needs to be downloaded and executed on users' network devices.

Further, interaction management engine 625 can determine whether a continuous channel between two devices should be established, used or terminated. A continuous channel can be structured so as to facilitate routing of future communications from a network device to a specified endpoint 112. This bias can persist even across message series (e.g., days, weeks or months). In some embodiments, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and endpoint 112. The score may pertain to an overall match or one specific to a given communication or communication series. Thus, for example, the score may reflect a degree to which a given endpoint 112 is predicted to be suited to respond to a network-device communication. In some embodiments, a score analysis can be used to identify each of an endpoint 112 to route a given communication to and whether to establish, use or terminate a connection. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different endpoint 112.

To illustrate, a set of three endpoints 112 associated with a client may be evaluated for potential communication routing. A score may be generated for each that pertains to a match for the particular communication. Each of the first two endpoints may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third endpoint is immediately available. It may be predicted that the second endpoint will be available for responding within 15 minutes, but that the first endpoint will not be available for responding until the next day. Thus, a fast-response sub-score for the first, second and third devices may be 1, 3 and 10. Finally, it may be estimated a degree to which an agent (associated with the endpoint) is knowledgeable about a topic in the communication. It may be determined that an agent associated with the third endpoint is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third endpoint. If routing to a particular endpoint is unsuccessful, the message can be routed to a device with the next-highest score, and so on.

A score may be compared to one or more absolute or relative thresholds. For example, scores for a set of endpoints 112 can be compared to each other to identify a high score to select an endpoint to which a communication can be routed. As another example, a score (e.g., a high score) can be compared to one or more absolute thresholds to determine whether to establish a continuous channel with an endpoint. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or endpoint in an account data store 635 to identify an account corresponding to the device. Further, account engine 630 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, an endpoint, an account and a client. Account engine 635 can subsequently notify a user of the channel's existence such that the user can be aware of the agent consistency being availed.

Interaction management engine 625 can further interact with a client mapping engine 640, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some embodiments, a message may not particularly correspond to any client. For example, a message may include a general query. Client mapping engine 640 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint).

Client data store 645 can include identifications of one or more endpoints 112 (and/or agents) associated with the client. A terminal routing engine 650 can retrieve or collect data pertaining to each of one, more or all such endpoints 112 (and/or agents) so as to influence routing determinations. For example, terminal routing engine 650 may maintain an endpoint data store 655, which can store information such as endpoints' 112 device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun.

It will be appreciated that, in various contexts, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When interaction management engine 625 has identified an endpoint to involve in a communication exchange or connection, it can notify terminal routing engine 650, which may retrieve any pertinent data about the endpoint from endpoint data store 655, such as a destination (e.g., IP) address, device type, protocol, etc. Processing engine 610 can then modify the message-inclusive communication or generate a new communication (including the message) so as to have a particular format, comply with a particular protocol, and so on. In some embodiments, a new or modified message may include additional data, such as account data corresponding to a network device, a message chronicle, and/or client data.

A message transmitter interface 660 can then transmit the communication to the endpoint 112. The transmission may include, for example, a wired or wireless transmission to a device housed in a separate housing. The endpoint 112 can include an endpoint in a same or different network (e.g., local-area network) as connection management system 150. Accordingly, transmitting the communication to the endpoint 112 can include transmitting the communication to an inter- or intra-network connection component.

Systems and methods for dynamically switching between bots, sometimes referred to as a "concierge service" herein, and endpoints 112 during communication sessions with network devices (e.g., operated by users) is provided. In some implementations, a concierge service 152 can be configured to autonomously chat with users. Further, the concierge service 152 can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, generating reports, tracking open conversation threads, and other suitable capabilities. In some implementations, while the concierge service 152 is communicating with a user in a chat session, a communication server can automatically and dynamically determine to transfer the chat session to an endpoint 112. For example, the concierge service 152 can communicate with users about certain tasks (e.g., updating a database record associated with a user), whereas, endpoints 112 can communicate with users about more difficult tasks (e.g., communicating using a communication channel to solve a technical issue).

In some implementations, determining whether to transfer a chat session between the concierge service 152 and the endpoints 112 can be based on an analysis of one or more characteristics of the messages in a communication session. Further, a dynamic sentiment score can be generated for the messages. For example, in cases where the sentiment score indicates that the user is frustrated with the concierge service 152, the system can automatically switch the concierge service 152 with an endpoint 112 to communicate with the user. See U.S. Ser. No. 15/171,525, filed Jun. 2, 2016, the disclosure of which is incorporated by reference herein in its entirety for all purposes. In some examples, determining whether to switch between the concierge service 152 and endpoints 112 can be performed without a prompt from a user. The determination can be performed automatically at the communication server based any number of factors, including characteristics of the current messages in the chat session, characteristics of previous messages transmitted by the user in previous chat sessions, a trajectory of a characteristic (e.g., a sentiment) over multiple messages in a conversation, or additional information associated with the user (e.g., profile information, preference information, membership information, and other suitable information associated with the user).

Figure 7:
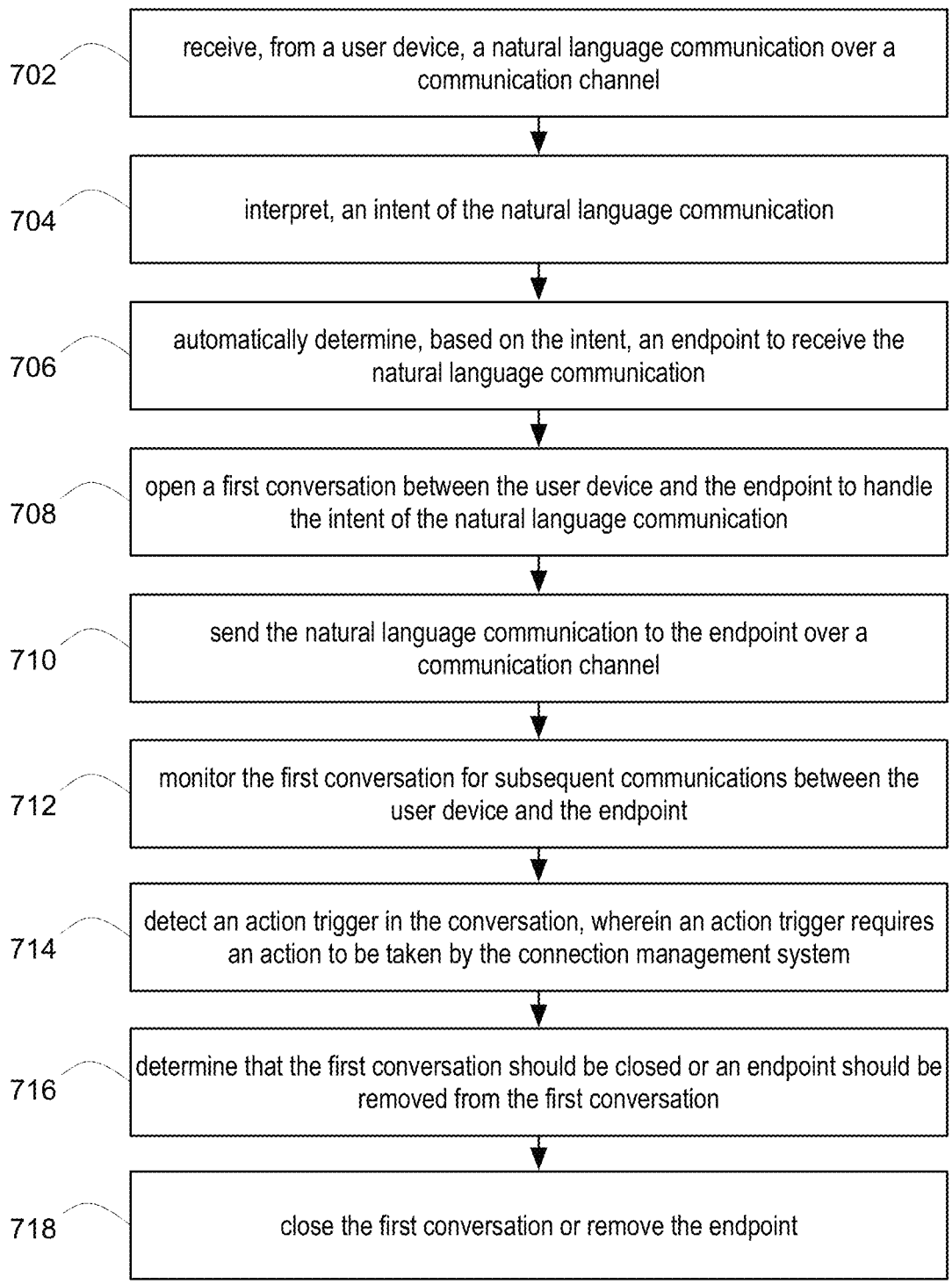
FIG. 7 shows an example method embodiment in accordance with some aspects of the present technology.

FIG. 7 shows an example method of initiating and facilitating a conversation between user 110 and an endpoint 112. The method begins when connection management system 150 receives (702) a natural language communication from network device 105 under control of user 110. As addressed above, the natural language communication does not require conformance to a rigid protocol including wake words, key words, specific phrases, explicitly naming services, etc.

Connection management system 150 can interpret (704) the received natural language communication to determine an intent of the natural language communication. As addressed above with respect to FIG. 6, connection management system 150 can determine an intent using concierge service 152, which is a type of artificial intelligence service that has been trained to classify natural language communications and to communicate back to a user in a dialog.

Connection management system 150 can automatically determine (706) an endpoint 112 to receive the natural language communication (from step 702). Connection management system 150 can determine (706) the endpoint 112 by matching the intent of the natural language communication to the endpoint 112. As described with respect to FIG. 6, in some embodiments, a given intent can be matched to one or more agents 120 having the necessary expertise to handle the intent and/or topic.

For example endpoint data store 655 can include relationships between endpoints 112 and topics for which those endpoints 112 can handle. For example, intents pertaining to acquiring products or services from a retailer or a category of retailers can be mapped to terminal devices 115 operated by agents 120 having access to a system that can be used to acquire the products or services (e.g., intents pertaining to purchasing of home-improvement products can be mapped to terminal devices operated by agents having access to a system that can be used to purchase home-improvement products). In some embodiments, endpoint data store 655 can record services that can be performed by a specific IOT device 155. For example endpoint data store 655 can record that user 110 has a smart thermostat, and connection management system 150 can determine that the smart thermostat is the appropriate endpoint 112 for natural language communications pertaining to an intent of controlling temperature in a residence by user 110.

In some embodiments, social user 145 can also be determined to have a particular expertise, and this can be recorded in endpoint data store 655. Social user 145 can be determined to have a particular expertise when social user 145 designates themselves as having a particular expertise, or when the connection management system 150 of the present technology observes that social user 145 has responded to natural language communications having a specific intent from user 110, and user 110 is observed to have been satisfied with the answer.

After connection management system 150 has automatically determined (706) the endpoint 112 to receive the natural language communication, connection management system 150 can open (708) and facilitate a conversation between the network device 105 and the endpoint 112 that has been determined (706) that it can handle the intent of the natural language communication. Opening (708) a conversation can include sending a message to the endpoint to notify them of the conversation that is about to be opened. In some embodiments, the concierge service 152 can ask permission from the endpoint 112 whether it is okay to join the endpoint 112 in a conversation with user 110.

In some embodiments, a conversation can exist even when a message has only been sent from user 110. For example, a conversation can be opened (708) even when it may only consist of a single message forwarded to an IOT device 155 to perform a function.

Connection management system 150 can then send (710) the natural language communication to the first endpoint 112 to initiate a conversation between user 110 operating network device 105 and the endpoint 112 (which may be operated by social user 145 or agent 120).

The concierge service 152 of connection management system 150 can monitor (712) the conversation for subsequent communications between network device 105 and the endpoint 112. In some embodiments the concierge service 152 monitors (712) the conversation to detect (714) an action trigger. An action trigger can be anything that requires an action to be taken by the connection management system 150.

For example when the concierge service 152 detects that the conversation between the user and the endpoint refers to a particular product, the concierge service 152 can trigger an action of communicating information regarding the particular product into the conversation. In such embodiments the action trigger is one that causes the concierge service 152 to take an active speaking role in the conversation.

In another example, when the concierge service 152 determines (716) that the conversation between user 110 and the terminal device has concluded, connection management system 150 can take action by closing (718) the conversation.

Figure 8:
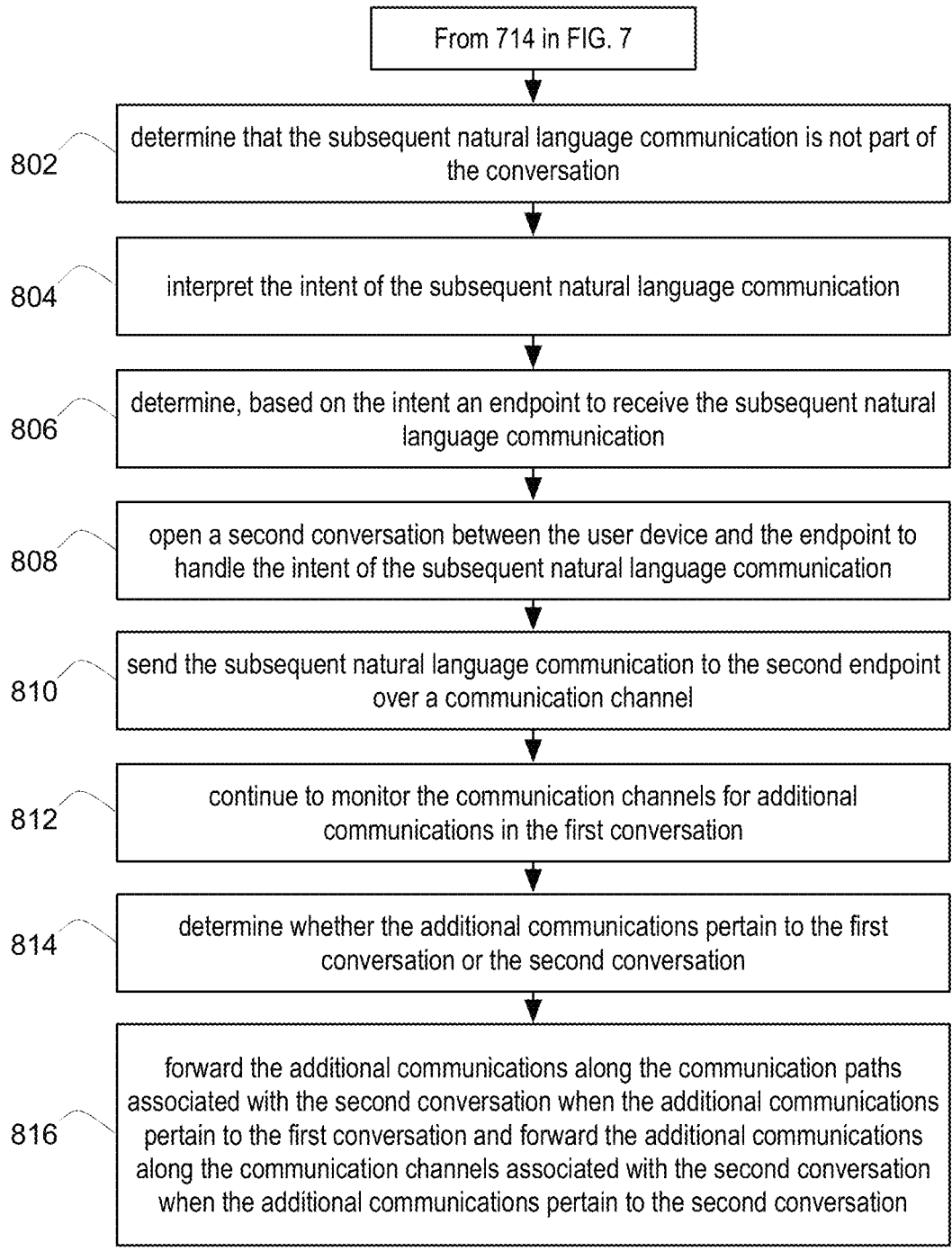
FIG. 8 shows an example method embodiment in accordance with some aspects of the present technology.

FIG. 8 illustrates another example of when an action trigger is detected. The method in FIG. 8 begins after step 712 in FIG. 7 where in the concierge service 152 is monitoring (712) the conversation between user 110 and the endpoint 112, and detects an action trigger (714). Concierge service 152 interprets intents (802) of subsequent communications in the conversation. In FIG. 8 the action trigger is the determination (804) that the intent of a communication within the conversation does not pertain to the ongoing conversation—a new intent has been detected by the concierge service 152.

Connection management system 150 can determine (806) a different endpoint 112 to receive the natural language communication having the new intent, and can open (808) a second conversation between network device 105 and the different endpoint 112. Connection management system 150 can send (810) the natural language communication having the new intent to the different endpoint 112.

When multiple conversation are concurrently occurring such as in FIG. 8, the concierge service 152 continues to monitor (812) additional communications received from the endpoint 112 pertaining to the first conversation or the endpoint 112 pertaining to the second conversation and communications coming from the network device 105 to determine (814) whether the additional communications are relevant to the first conversation or the second conversation. Connection management system 150 can forward (816) the additional communications to the endpoint 112 of the first conversation when the additional communications pertain to the first conversation and can forward the additional communications to the second endpoint 112 associated with the second conversation when the additional communications pertain to the second conversation.

When multiple, conversation threads concurrently occurring, it becomes the role of the concierge service 152 and connection management system 150 to manage the different communication threads, and to ensure that communications relevant to the first conversation only go to the endpoint 112 associated with the first conversation and to ensure that communications relevant to the second conversation only go to the endpoint 112 associated with the second conversation. In some embodiments as will be discussed with respect to FIG. 10B, concierge service 152 can delineate the different conversation threads to user 110.

FIG. 9A, FIG. 9B, FIG. 9C, and FIG. 9D illustrate examples of how communications are managed by connection management system 150 in conversations.

Figure 9A:
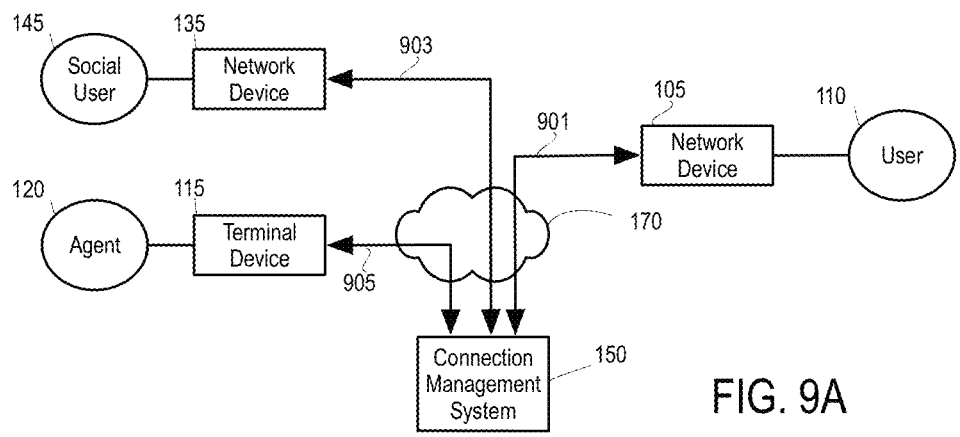
FIGS. 9A, 9B, 9C, and 9D show example connections used in example conversations in accordance with some aspects of the present technology.

FIG. 9A illustrates a communication channel between various entities in one or more conversations. In FIG. 9A network device 105, which is operated by user 110, sends communications to connection management system 150 over the first communication channel 901. All communications between network device 105 and connection management system 150 are transmitted over communication channel 901 regardless of whether the communications pertain to one conversation, or a plurality of conversations. Terminal device 115 is operated by agent 120, and all communications between terminal device 115 and connection management system 150 are transmitted over communication channel 905. Network device 135 is operated by social user 145, and all communications between network device 135 and connection management system 150 are transmitted over communication channel 903.

Any communication from any of network device 105, network device 135, or terminal device 115 is sent to connection management system 150, which determines which devices (endpoints 112 and/or network device 105) should receive the communication. In most cases every device that is active in the conversation should receive the communication but any devices not active in the conversation should not receive the communication.

Figure 9B:
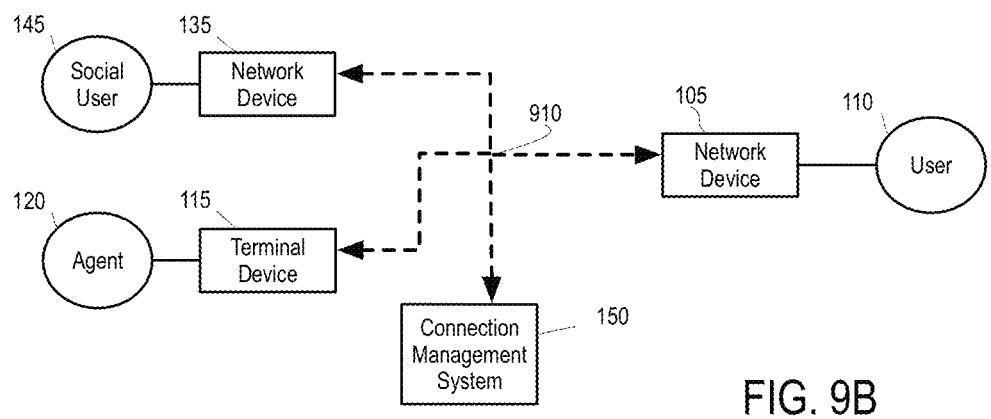

While FIG. 9A illustrates the various communication channels between the entities, FIG. 9B illustrates conversation 910 that includes communications between network device 105, connection management system 150, network device 135, and terminal device 115. As illustrated in FIG. 9B, conversation 910 joins all the entities in the conversation.

Figure 9C:
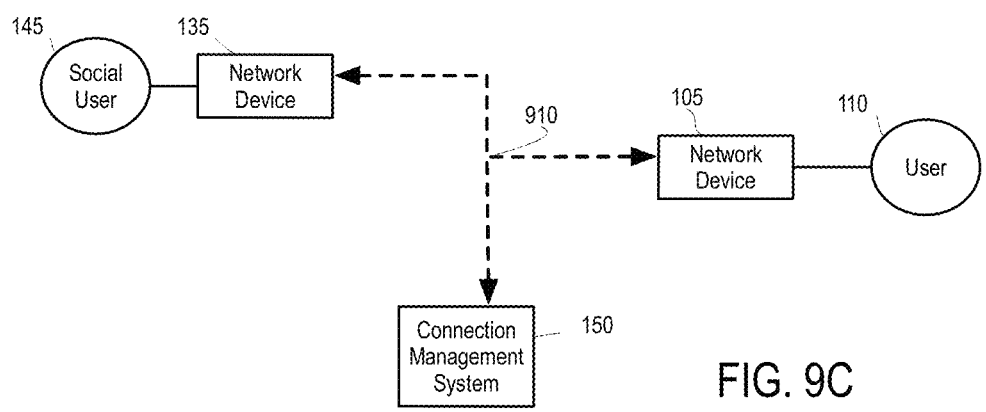

FIG. 9C illustrates conversation 910, but in FIG. 9C terminal device 115 is no longer included in the conversation and is not represented in FIG. 9C. During monitoring of the conversation, the concierge service 152 determined that terminal device 115 was no longer needed in the conversation, and connection management system 150 recognized this state as an action trigger to remove terminal device 115 from the conversation. As a result, connection management system will discontinue forwarding communications to terminal device 115 in this conversation.

Figure 9D:
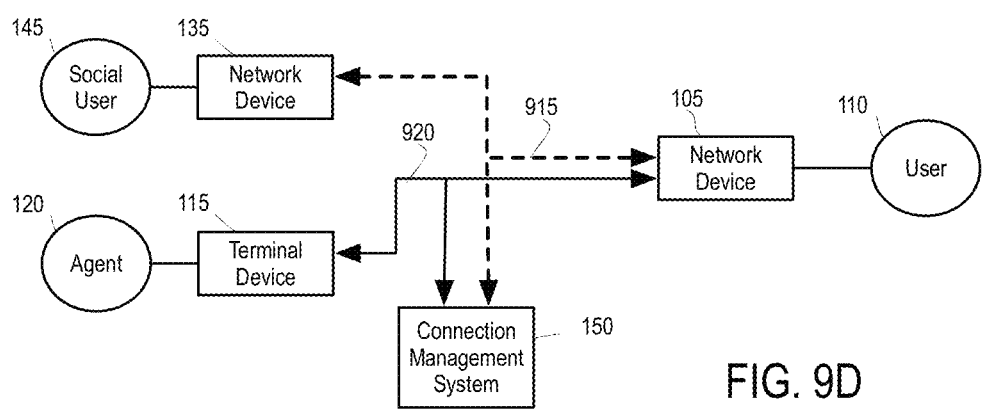

FIG. 9D illustrates an example multi-threaded conversation. In FIG. 9D the same communication channels are used as illustrated in FIG. 9A, except the logical conversations are different, and connection management system 150 forwards communications accordingly. In FIG. 9D network device 105, connection management system 150, and network device 135 are engaged in a first conversation 915. This requires connection management system 150 to determine that a communication from network device 105 pertains to the first conversation 915. Connection management system can determine that communications pertain to the same conversation when the topic of each communication fits with the topic/intent of the conversation.

Timing of communications can be an additional factor for determining to which conversation a communication is intended. If network device 105 is sends a communication right after receiving a communication in the first conversation 915, it may be more likely that the network device's communication is a reply to the received communication.

Another factor can be how well a given communication matches an expected communication. Since the concierge service 152 is a conversational interface that can itself generate replies in a conversation the concierge service 152 can analyze a response for the likelihood that it is a response to an earlier communication in the first conversation 915 (or another conversation).

In some embodiments communications can be addressed to members of the conversation by including @endpoint, where "endpoint" is the user(s) the message is intended for. In some embodiments the topic can be included in the message including #topic, where "topic" is the topic of the conversation or other identifier of the conversation.

FIG. 9D also illustrates a second conversation 920 between network device 105, terminal device 115, and connection management system 150. Once again, all communications going to or from network device 105 go over the same communication channel between network device 105 and connection management system 150.

Figure 10A:
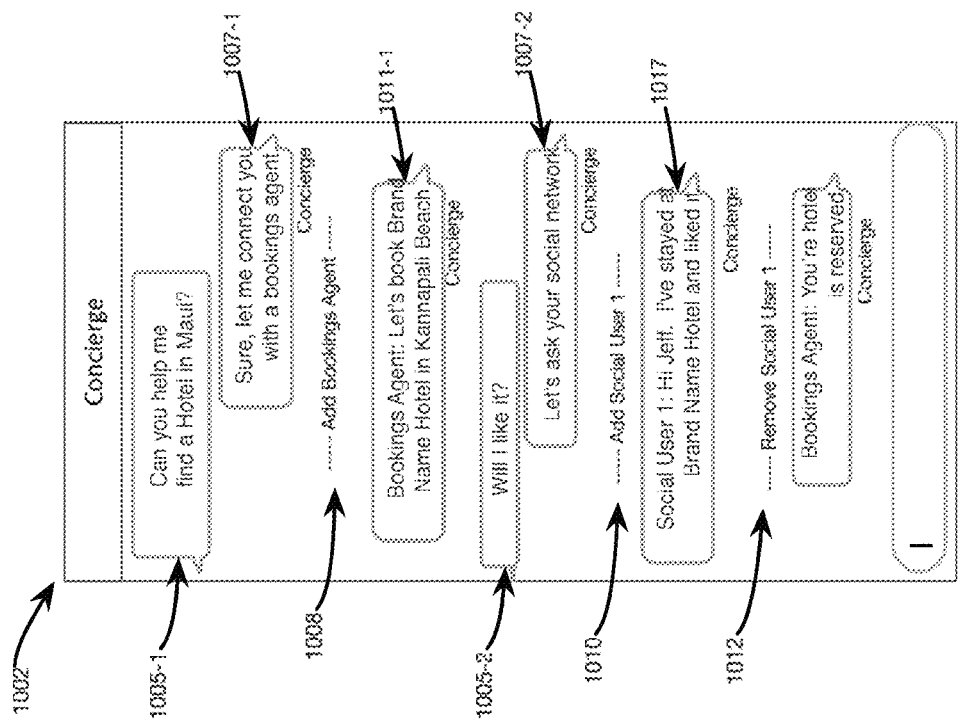
FIGS. 10A, and 10B show example user interfaces for communications facilitated by the connection management system in accordance with some aspects of the present technology.

FIG. 10A illustrates an example user interface 1002 provided by a text messaging application on network device 105. As addressed above, text messaging application is a standard software application on network device 105 and does not need to be provided by and entity associated with connection management system 150.

In FIG. 10A (and FIG. 10B) messages coming from the same entity have the same reference number. Messages from user 110 are labeled 1005, messages from the concierge service 152 are labeled 1007, messages from the bookings agent are labeled 1011, messages from social user 1 are labeled 1017, and messages from home supply are labeled 1023.

As seen in FIG. 10A, a user can start a conversation by making a request to the concierge service 152. In this example the user has asked "Can you help me find a hotel in Maui?" 1005-1. The concierge service 152 replies that is going to connect the user with a bookings agent 1007-1.

In some embodiments, connection management system 150 can insert a contextual message 1008 into user interface 1002. The contextual message 1008 can inform the user that the bookings agent has been added to the conversation. However, it will be appreciated, that some messaging applications will not support contextual messages, and in such embodiments contextual messages will not be presented, or will need to be presented as statements from concierge service 152.

The conversation in FIG. 10A continues when the bookings agent enters the conversation and suggests, "Let's book brand-name hotel in Kannaplai Beach" 1011-1. As seen in FIG. 10A, the message may appear as if it is from the concierge service 152 however the message begins by identifying the bookings agent. The message it appears as if it's from the concierge service 152 because the text messaging application used to conduct the conversation on network device 105 is sending messages to and receiving messages from concierge service 152. However connection management system 150 is forwarding messages from the bookings agent using terminal device 115. In order to avoid confusing user 110, messages that originate from a party other than concierge service 152 can begin by identifying the source of the message.

In some embodiments, the messaging application on network device 105 may support additional features that might allow concierge service 152 to designate messages from a particular source such that messages in user interface 1002 can be labeled with the actual source instead of being labeled as from the concierge service 152. While messages may be labeled with a source, the underlying contact information for that source can be kept confidential so that the user cannot contact agent 120 or social user 145 or client 125 outside the system, unless the user has a separate relationship with such an endpoint and separately knows the contact information for the endpoint.

Since the connection management system 150 in an intermediary for all conversations, the connection management system 150 is the only entity that needs to know contact information for the user and/or the endpoints and can keep this information private.

So far, the description of FIG. 10A has illustrated how the concierge service 152 (more specifically the connection management system 150) can act as an intermediary between user 110 and an endpoint 112, and has illustrated how the conversation can appear in the text messaging application on network device 105.

FIG. 10A also illustrates how the concierge service 152 can monitor the conversation to detect action triggers, such as an action trigger to bring another endpoint 112 into the conversation. For example after the bookings agent suggest a hotel 1011-1, user 110 may ask a follow up question "Will I like it?" 1005-2, which the concierge service 152 may recognize as a question that is not suited to the booking agent's expertise. Therefore, connection management system 150 may determine that another endpoint 112 is better suited to answer the follow-up question. In the example shown in FIG. 10A, the connection management system 150 determines that the user's social network may be best suited to answer a question about the user's hotel preferences, and concierge service 152 can inform the members of the conversation that it is going to ask members of the social network 1007-2.

While not shown in FIG. 10A, the concierge service 152 may have side conversations with endpoints 112 that are not shown in the conversation to user 110. For example the concierge service 152 may send a message to members of user's 110 social network asking whether any of those users are familiar with the hotel suggested by the bookings agent. When one of the social users responds that they are familiar with the hotel, the concierge service 152 may ask the social user if they are willing to be added to the conversation shown in FIG. 10A. It will be appreciated that the members of user's 110 social network can be direct or indirect (connections of connections) connections within the user's social graph.

Assuming social user 145 has agreed to be added to the conversation with user 110 and the bookings agent, concierge service 152 can inform 1010 the members of the conversation that social user 145 is being added to the conversation. Social user 145 can then provide their opinions about the suggested hotel 1017.

Again the concierge service 152 continues to monitor the conversation, and the concierge service 152 may detect another action trigger—in this case that social user 145 is no longer needed in the conversation. Accordingly connection management system 150 can remove social user one from the conversation and concierge service 152 can notify 1012 the other members in the conversation.

It will be appreciated by those of ordinary skill in the art, that the conversation depicted in FIG. 10A is provided to illustrate various concepts, and that the conversation may not be typical of a conversation between a user and a bookings agent using the present technology. For example, the bookings agent likely could have provided additional information about the hotel including star ratings etc., and the concierge service 152 may not necessarily consider message 1005-2 as being of a nature that requires involvement of social network users.

Figure 10B:
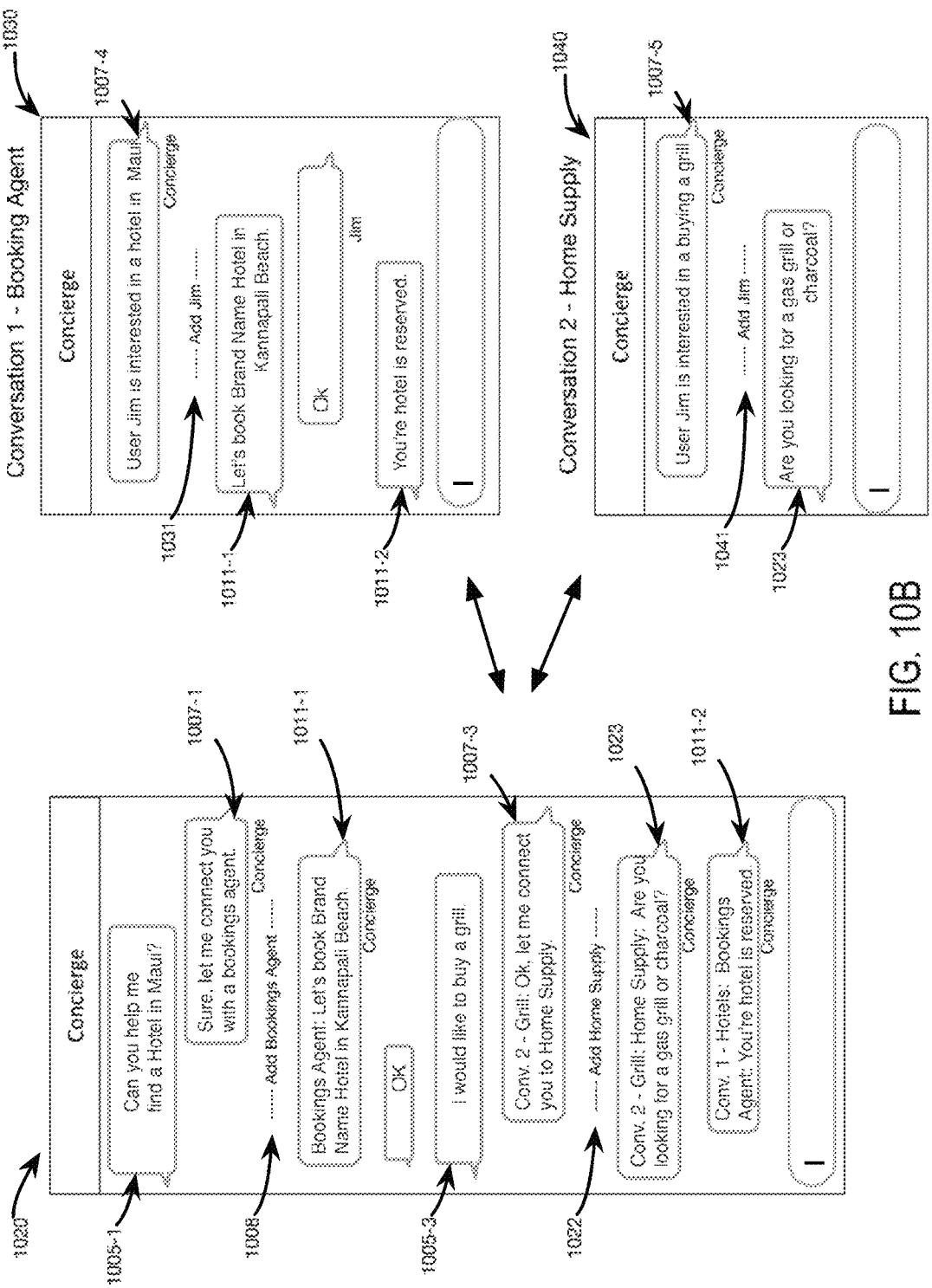

FIG. 10B illustrates an example user interface 1020 showing two concurrent conversations involving user 110 using network device 105. FIG. 10B also illustrates how each of the concurrent conversations can appear to the endpoints 112 of the respective conversations.

As seen in interface 1020 messages 1005-1, 1007-1, 1008, and 1011-1 are the same as depicted in FIG. 10A. However, in message 1005-3 user 110 says, "I would like to buy a grill." The concierge service 152, through its monitoring of the conversation, can interpret the intent of message 1005-3, and determine that message 1005-3 is not part of the conversation with the bookings agent. Concierge service 152 can recognize the different intent as an action trigger to open a second conversation. Concierge service 152 can send message 1007-3 that includes information identifying the messages pertaining to the second conversation having a topic pertaining to a grill. Connection management system 150 can then add an agent of Home Supply 1022 that can send message 1023.

Any message pertaining to the conversation regarding a grill can be designated as part of conversation 2 and include the topic and identification of the endpoint 112. For example message 1023 pertains to conversation 2 regarding the topic of a grill and is from an agent of Home Supply whom is asking, "Are you looking for a gas grill or charcoal?"

In the same message interface 1020, the first conversation can continue. For example message 1011-2 is identified as being part of the conversation 1 pertaining to the topic of hotels and is from the bookings agent.

As noted above since user interface 1020 is an interface of a standard text messaging application that shows all communications between user 110 and the same address, in this case connection management system 150, in the same chain, all of the messages appear in user interface 1020 even though they pertain to different conversations and the different conversations are between user 110 and different endpoints 112.

While user interface 1020 shows all of the messages sent to and from network device 105, user interface 1030 shows only messages pertaining to the first conversation. User interface 1030 is displayed on a terminal device operated by the bookings agent. User interface 1030 may be of a standard text messaging application, or of a custom application used by booking agent to assist customers.

As addressed above, connection management system 150 performs an intermediary role and forwards messages to the appropriate endpoints 112. Since connection management system 150 (using concierge service 152) determines which conversation each message pertains to, connection management system 150 can forward only messages pertaining to the conversation regarding the topic of hotels to the booking agent.

As depicted in user interface 1030, communications pertaining to the first conversation regarding the topic of hotels is presented from the point of view of the booking agent. As such message 1007-4 is a communication from the concierge service 152 telling booking agent that user 110 is interested in a hotel in Maui.

Note that message 1007-4 is not the same as message 1005-1 from user 110. In some embodiments, connection management system 150 can reformat or paraphrase messages to provide a better user experience.

Also in interface 1030, the booking agent can see that the concierge service 152 has added Jim 1031, and the subsequent messages are the same as in interface 1020 except that only messages pertaining to the first conversation regarding finding a hotel in Maui are presented. Connection management system 150 does not forward any messages pertaining to the conversation regarding buying a grill to the Bookings Agent because these messages are irrelevant to the Bookings Agent.

User interface 1040 depicts communications pertaining to the second conversation regarding the topic of a grill and is presented from the point of view of agent of Home Supply. Again concierge service 152 can begin the conversation with message 1007-5 to the agent of home supply and can inform 1041 agent of home supply that user 110 is being added to the conversation.

While FIG. 10A and FIG. 10B illustrate a text messaging interface, in some embodiments, connection management system 150 can connect network device 105 and one or more endpoints 112 in a voice conversation by creating a telephony call, voice over IP call, or video conference between the devices. In some embodiments, each user can consent to being joined in a voice or video conversation.

Additionally while FIG. 10A and FIG. 10B illustrate text communications, the concierge service 152 of present technology can receive voice inputs and convert the voice input into text using a speech-to-text service. Likewise concierge service 152 can also read text messages to user 110 using a text-to-speech service.

Another goal of the present technology to be able to fulfill the user's intent from any reasonable query or command. While client data store 645 and endpoint data store 655 may be robust databases including many clients and experts on many different topics and intents, connection management system 150 may not always be able to determine a suitable endpoint 112 to fulfill the user's intent. In such instances, connection management may poll social users within the social network of user 110 that may be able to help. In some embodiments connection management system 150 may also poll social users of social users to increase the size of the network to potentially fulfill the user's intent. Even when connection management system 150 cannot determine any endpoint 112 to assist user 110, unsatisfied queries can be anonymously posted in a public forum for the public to attempt to answer.

Concierge service 152 of the present technology can continue to analyze and assess performance in fulfilling the user's intent for each conversation. When agent 120 that is recognized as an expert in a topic does not satisfactorily handle conversations related to that topic often enough to remain a satisfactory expert, that agent can be removed as an expert on that topic. Conversely, when social user 145 satisfactorily handles a conversation related to a topic, concierge service 152 of the present technology can ask the social user 145 if they are knowledgeable enough to participate in other conversations involving that topic. The performance of social user 145 can be monitored, and a satisfactorily performing social user can become an agent associated with the topic. Note that social user 145 can remain social user for conversations that do not pertain to the topic for which they have become an acknowledged expert and agent.

While the example given in FIG. 10A and FIG. 10B may give the impression of a conversation(s) occurring over a relatively short period of time, some conversations may include long intervals between communication exchanges. For example, social user 145 may not be available at the moment communication is received by them, and therefore there may be a delay in receiving any response. A protracted conversation can sometimes be forgotten. Accordingly concierge service 152 can periodically follow up on conversations that the concierge service 152 has not determined to be completed. In this way the concierge service 152 can also act as a reminder service to ensure that intents and topics are not forgotten. When the concierge service 152 follows up on a dormant conversation, concierge service 152 may also provide other suggestions or inquire about additional information that may allow concierge service 152 to fulfill the intent of the conversation.

Through its monitoring of conversation, the concierge service 152 may detect common questions and common answers. In such embodiments, the concierge service 152 may provide initial communications attempting to satisfy the intent of a conversation without engaging any other endpoint 112.

Figure 11:
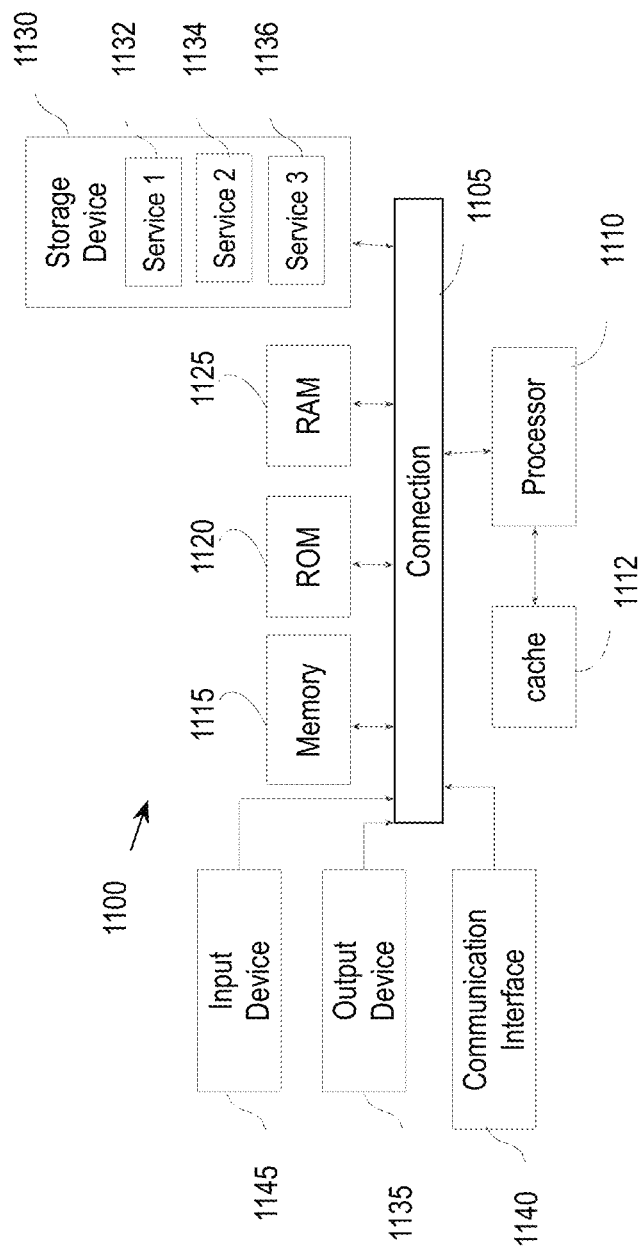
FIG. 11 shows an example embodiment of a computing system in accordance with some aspects of the present technology.

FIG. 11 shows an example of computing system 1100, which can be for example any computing device making up connection management system 150, concierge service, network device 105, client device 130, network device 135, or terminal device 115, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments computing system 1100 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

When machine-readable instructions are utilized to cause a machine to perform certain inventive steps or functions, the machine can be considered to itself be an inventive machine programmed to specifically perform those steps or functions. For example, while the machine might, without the instructions, be considered a general purpose computing device, with the instructions, the machine is considered a specialized device, explicitly configured to carry out the inventive steps of functions.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

While the principles of the disclosure have been described above in connection with specific apparatuses and methods, it is to be clearly understood that this description is made only by way of example and not as limitation on the scope of the disclosure.

What is claimed is:

1. A non-transitory computer-readable medium comprising instructions stored thereon, the instructions executable by a connection management system to:
   receive a natural language communication associated with a user device in a communication session;
   interpret an intent of the natural language communication using natural language processing, wherein the natural language communication corresponds to conversational human language that does not require conformance to a rigid protocol corresponding to at least one of wake words, key words, specified phrases, or explicitly named services;
   automatically determine a social network member endpoint that corresponds to the intent of the natural language communication, the social network member endpoint being selected from a collection of endpoints including at least one agent and at least one social network member;
   transfer the communication session to the social network member endpoint, the communication session configured to facilitate a first conversation between the user device and the social network member endpoint, wherein the natural language communication is sent to the social network member endpoint in the communication session;
   track a dynamic capability score for the communication session based on messages with a current endpoint; and
   automatically switch the communication session from the current endpoint to another endpoint based on a change in the dynamic capability score.

2. The non-transitory computer-readable medium of claim 1, further comprising instructions executable by the connection management system to:
   monitor communications between the user device and the social network member endpoint in the communication session; and
   detect a new intent corresponding to an action trigger associated with an action to be taken by the connection management system.

3. The non-transitory computer-readable medium of claim 1, further comprising instructions executable by the connection management system to:
   provide a message in the communication session in accordance with to a new detected intent.

4. The non-transitory computer-readable medium of claim 1, further comprising instructions executable by the connection management system to:
   send a private message to the user device, or to send a private message to the social network member endpoint in accordance with a new detected intent.

5. The non-transitory computer-readable medium of claim 1, further comprising instructions executable by the connection management system to:
   add a second endpoint to the communication session in accordance with a new detected intent; and
   send a communication that is part of the communication session to the second endpoint.

6. The non-transitory computer-readable medium of claim 1, further comprising instructions executable by the connection management system to:
   drop the social network member endpoint from the communication session, and discontinue communications that are part of the communication session from being sent to the dropped endpoint.

7. The non-transitory computer-readable medium of claim 1, further comprising instructions executable by the connection management system to:
determine that the first conversation should be closed; and
close the first conversation with the social network member endpoint.

8. The non-transitory computer-readable medium of claim 1, further comprising instructions executable by the connection management system to:
determine that the first conversation has gone dormant; and
send a communication as part of the first conversation to the user device to resume the first conversation.

9. The non-transitory computer-readable medium of claim 1, further comprising instructions executable by the connection management system to:
monitor communications from the user device for a subsequent natural language communication;
interpret the intent of the subsequent natural language communication;
determine that the intent of the subsequent natural language communication does not correspond to the social network member endpoint;
determine that the intent of the subsequent natural language communication corresponds to a second endpoint; and
transfer the communication session to the second endpoint, the communication session configured to facilitate a second conversation between the user device and the second endpoint, wherein the subsequent natural language communication is sent to the second endpoint in the communication session.

10. The non-transitory computer-readable medium of claim 1, further comprising instructions executable by the connection management system to:
continue to monitor additional communications within the communication session;
determine whether the additional communications pertain to the first conversation or a second conversation; and
forward the additional communications to the social network member endpoint when the additional communications pertain to the first conversation and forward the additional communications to a second endpoint when the additional communications pertain to the second conversation, wherein the first conversation and the second conversation are maintained in the communication session concurrently.

11. A computer-implemented method comprising:
receiving a natural language communication associated with a user device in a communication session that includes a connection management system;
interpreting an intent of the natural language communication using natural language processing, wherein the natural language communication corresponds to conversational human language that does nor require conformance to a rigid protocol corresponding to at least one of wake words, key words, specified phrases, or explicitly named services;
automatically determining a social network member endpoint that corresponds to the intent of the natural language communication, the social network member endpoint being selected from a collection of endpoints including at least one agent and at least one social network member;
transferring the communication session to the social network member endpoint, the transferred communication session configured to facilitate a first conversation between the user device and the social network member endpoint, wherein the natural language communication is sent to the social network member endpoint in the transferred communication session;
tracking a dynamic capability score for the communication session based on messages with a current endpoint; and
automatically switch the communication session from the current endpoint to another endpoint based on a change in the dynamic capability score.

12. The method of claim 11, further comprising:
monitoring communications between the user device and the social network member endpoint in the communication session; and
detecting a new intent corresponding to an action trigger associated with an action to be taken by the connection management system.

13. The method of claim 11, further comprising:
providing a message in the communication session in accordance with a new detected intent.

14. The method of claim 11, further comprising:
sending a private message to the user device, or sending a private message to the social network member endpoint in accordance with a new detected intent.

15. The method of claim 11, further comprising:
adding a second endpoint to the communication session in accordance with a new detected intent; and
sending a communication that is part of the communication session to the second endpoint.

16. The method of claim 11, further comprising:
dropping the social network member endpoint from the communication session, and
discontinuing communications that are part of the communication session from being sent to the dropped endpoint.

17. The method of claim 11, further comprising:
determining that the first conversation should be closed; and
closing the first conversation with the social network member endpoint.

18. The method of claim 11, further comprising:
determining that the first conversation has gone dormant; and
sending a communication as part of the first conversation to the user device to resume the first conversation.

19. The method of claim 11, further comprising:
monitoring communications from the user device for a subsequent natural language communication;
interpreting the intent of the subsequent natural language communication;
determining that the intent of the subsequent natural language communication does not correspond to the social network member endpoint;
determining that the intent of the subsequent natural language communication corresponds to a second endpoint; and
transferring the communication session to the second endpoint, the communication session configured to facilitate a second conversation between the user device and the second endpoint, wherein the subsequent natural language communication is sent to the second endpoint in the communication session.

20. The method of claim 11, further comprising:
continuing to monitor additional communications within the communication session;
determine whether the additional communications pertain to the first conversation or a second conversation; and
forward the additional communications to the social network member endpoint when the additional communications pertain to the first conversation and forward the additional communications to a second endpoint when the additional communications pertain to the second conversation, wherein the first conversation and the second conversation are maintained in the communication session concurrently.

21. A system comprising:
a interface that receives a natural language communication associated with a user device in a communication session; and
a processor that executes connection management instructions, wherein the processor executes the connection management instructions to:
   interprets an intent of the natural language communication using natural language processing, wherein the natural language communication corresponds to conversational human language that does not require conformance to a rigid protocol corresponding to at least one of wake words, key words, specified phrases, or explicitly named services;
   automatically determines a social network member endpoint that corresponds to the intent of the natural language communication, the social network member endpoint being selected from a collection of endpoints including at least one agent and at least one social network member;
   transfers the communication session to the social network member endpoint, the transferred communication session configured to facilitate a first conversation between the user device and the social network member endpoint, wherein the natural language communication is sent to the social network member endpoint in the transferred communication session;
   tracks a dynamic capability score for the communication session based on messages with a current endpoint; and
   automatically switches the communication session from the current endpoint to another endpoint based on a change in the dynamic capability score.

22. The system of claim 21, the processor executing further instructions for:
monitoring communications between the user device and the social network member endpoint in the communication session; and
detecting a new intent corresponding to an action trigger associated with an action to be taken by the connection management system.

23. The system of claim 21, the processor executing further instructions for:
providing a message in the communication session in accordance with a new detected intent.

24. The system of claim 21, the processor executing further instructions for:
sending a private message to the user device, or sending a private message to the social network member endpoint in accordance with a new detected intent.

25. The system of claim 21, the processor executing further instructions for:
adding a second endpoint to the communication session in accordance with a new detected intent; and
sending a communication that is part of the communication session to the second endpoint.

26. The system of claim 21, the processor executing further instructions for:
dropping the social network member endpoint from the communication session, and
discontinuing communications that are part of the communication session from being sent to the dropped endpoint.

27. The system of claim 21, the processor executing further instructions for:
determining that the first conversation should be closed; and
closing the first conversation with the social network member endpoint.

28. The system of claim 21, the processor executing further instructions for:
determining that the first conversation has gone dormant; and
sending a communication as part of the first conversation to the user device to resume the first conversation.

29. The system of claim 21, the processor executing further instructions for:
monitoring communications from the user device for a subsequent natural language communication;
interpreting the intent of the subsequent natural language communication;
determining that the intent of the subsequent natural language communication does not correspond to the social network member endpoint;
determining that the intent of the subsequent natural language communication corresponds to a second endpoint; and
transferring the communication session to the second endpoint, the communication session configured to facilitate a second conversation between the user device and the second endpoint, wherein the subsequent natural language communication is sent to the second endpoint in the communication session.

30. The system of claim 21, the processor executing further instructions for:
continuing to monitor additional communications within the communication session;
determine whether the additional communications pertain to the first conversation or a second conversation; and
forward the additional communications to the social network member endpoint when the additional communications pertain to the first conversation and forward the additional communications to a second endpoint when the additional communications pertain to the second conversation, wherein the first conversation and the second conversation are maintained in the communication session concurrently.

* * * * *